United States Patent
Luo et al.

(10) Patent No.: US 10,531,435 B2
(45) Date of Patent: Jan. 7, 2020

(54) RESOURCE PROCESSING METHOD AND DEVICE

(71) Applicant: ZTE Corporation, Shenzhen (CN)

(72) Inventors: Wei Luo, Shenzhen (CN); Lin Chen, Shenzhen (CN); Feng Xie, Shenzhen (CN)

(73) Assignee: XI'AN ZHONGXING NEW SOFTWARE CO., LTD., Shaanxi (CN)

(*) Notice: Subject to any disclaimer, the term of this patent is extended or adjusted under 35 U.S.C. 154(b) by 29 days.

(21) Appl. No.: 15/555,195

(22) PCT Filed: Feb. 19, 2016

(86) PCT No.: PCT/CN2016/074089
§ 371 (c)(1),
(2) Date: Sep. 1, 2017

(87) PCT Pub. No.: WO2016/138822
PCT Pub. Date: Sep. 9, 2016

(65) Prior Publication Data
US 2018/0054804 A1  Feb. 22, 2018

(30) Foreign Application Priority Data
Mar. 2, 2015  (CN) .......................... 2015 1 0093308

(51) Int. Cl.
*H04W 72/04* (2009.01)
*H04W 4/02* (2018.01)
*H04W 76/14* (2018.01)

(52) U.S. Cl.
CPC ........... *H04W 72/04* (2013.01); *H04W 4/023* (2013.01); *H04W 76/14* (2018.02)

(58) Field of Classification Search
CPC .............................. H04W 72/04; H04W 4/023
See application file for complete search history.

(56) References Cited

U.S. PATENT DOCUMENTS

2016/0142898 A1* 5/2016 Poitau ................... H04W 76/14
                                                                370/329
2016/0150391 A1  5/2016 Lee
2016/0242219 A1* 8/2016 Shi ......................... H04W 76/14

FOREIGN PATENT DOCUMENTS

| CN | 104185247 A | 12/2014 |
| CN | 104202821 A | 12/2014 |
| WO | 2014098517 A1 | 6/2014 |
| WO | 2015009123 A1 | 1/2015 |
| WO | 2017101681 A1 | 6/2017 |

OTHER PUBLICATIONS

International Search Report for corresponding application PCT/CN2016/074089 filed on Feb. 19, 2016; dated Apr. 14, 2016.
(Continued)

*Primary Examiner* — Jackie Zuniga Abad
(74) *Attorney, Agent, or Firm* — Cantor Colburn LLP

(57) ABSTRACT

A resource processing method and device are provided. In the method, a first UE transmits configuration information of a transmission and/or reception resource or resource pool to a second UE, and the resource or resource pool is used for indicating resource information used in information interaction between the second UE and the first UE.

15 Claims, 6 Drawing Sheets

(56) References Cited

OTHER PUBLICATIONS

European Search Report for corresponding application EP16758438; dated Feb. 20, 2018.
Kyocera:, "Resource Allocation Schemes for D2D Communication", 3GPP Draft, vol. RAN WG2, No. San Francisco, USA, 20131111-20131115, Nov. 13, 2013, XP050737039.

* cited by examiner

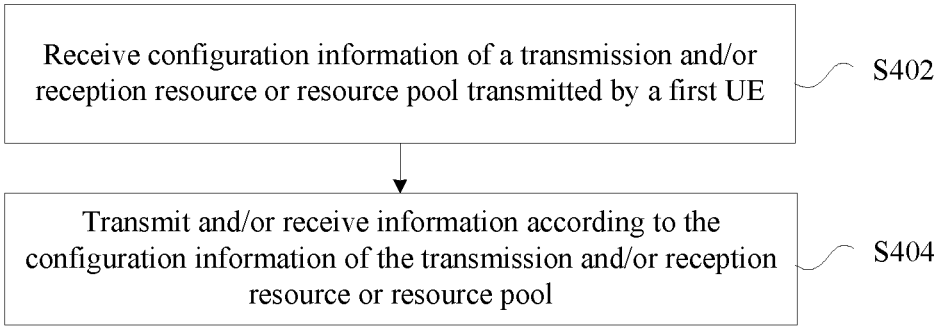
Fig. 3
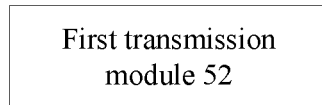
Fig. 4
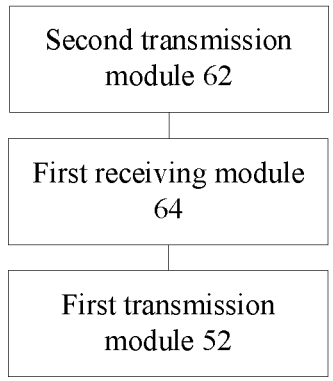
Fig. 5
Fig. 6

RESOURCE PROCESSING METHOD AND DEVICE

TECHNICAL FIELD

The present disclosure relates to the field of communications, and more particularly to a resource processing method and device.

BACKGROUND

With the development of radio multimedia services, on the one hand, demands of people for high data rate and user experience are increasing, and on the other hand, demands of people for knowing and communicating with a person or thing nearby, namely for Proximity Services (ProSe) or sidelink are also increasing due to application scenarios such as public security, social networking, short-range data sharing and local advertising. As a result, the requirement on the system capacity and coverage of a traditional cellular network may be increased.

However, a traditional cellular network mainly based on base stations is obviously restricted in terms of high data rate and ProSe support. Under the background of this demand, a Device-to-Device (D2D) technology representative of a new direction for future communication technology development emerges. Application of the D2D technology can alleviate burdens on a cellular network, reduce the battery power consumption of a User Equipment (UE), increase data rate, and improve the robustness of a network infrastructure, thereby well meeting requirements for the aforementioned high data rate services and ProSe.

FIG. 1 is a diagram illustrating direct discovery or communication between D2D UEs. As shown in FIG. 1, the D2D technology may work in a licensed band or unlicensed band to allow a plurality of UEs (also called as D2D UEs) supporting a D2D function to perform direct discovery or direct communication in the presence or absence of a network infrastructure. At present, there are mainly three D2D application scenarios. In a first D2D application scenario, UE1 and UE2 perform data interaction under the coverage of a cellular network, and user plane data does not pass through the network infrastructure, as shown in Mode 1 of FIG. 1. In a second D2D application scenario, for a UE in a weak-coverage or out-of-coverage region (e.g., UE4 under transmission of a first UE), the UE4 with poor signal quality is allowed to communicate with the network through UE3 under network coverage, so that coverage of an operator can be expanded and capacity of the network can be improved, as shown in Mode 2 of FIG. 1. In a third D2D application scenario, when an earthquake occurs or in an emergency, if the cellular network cannot work normally, direct communication between devices is allowed, for example, UE5, UE6 and UE7 may perform one-hop or multi-hop data communication in the control plane and the user plane without passing through the network infrastructure.

The D2D technology may include a D2D discovery technology and a D2D communication technology. The D2D discovery technology refers to a technology for determining whether a first UE is in proximity to a second UE. D2D UEs may discover each other by transmitting or receiving a discovery signal. The D2D communication technology refers to a technology where some or all communication data may be directly transmitted between D2D UEs without passing through the network infrastructure. An interface used by a UE for directly communicating with another UE through the D2D technology may be a PC5 interface, and an interface used by a UE for communicating with a serving base station may be a Uu interface.

Before performing D2D discovery or D2D communication, the D2D UEs may need to acquire their respective corresponding radio resources first. According to the progress of an existing 3rd Generation Partnership Project (3GPP) standard conference, there are two resource allocation manners for radio resource acquisition in both D2D discovery and D2D communication. In a first resource allocation manner, resources may be acquired in a resource allocation acquisition manner based on UE selection. In a second resource allocation manner, a base station (e.g., an evolved NodeB (eNB)) schedules and allocates dedicated resources for D2D discovery or D2D communication to a UE. In the first resource allocation manner, a base station or a system may pre-allocate a D2D resource pool, a UE participating in D2D discovery or D2D communication or a Proximity Service based UE (ProSe UE) may monitor the resource pool, and radio resources may be acquired in a resource allocation acquisition manner based on UE selection. In the second resource allocation manner, the base station may allocate appropriate radio resources to the ProSe UE according to the request of the ProSe UE.

FIG. 2 is a diagram of a relay system. As shown in FIG. 2, a relay, serving as a UE, may communicate with a network using an existing Long Term Evolution (LTE) manner, and may also communicate with UEs (e.g., UE1 and UE2 in the figure) out of coverage by using a D2D manner, including D2D discovery and/or D2D communication. If the UEs out of coverage transmit data to a base station through the relay, these UEs are called remote UEs. According to the existing manner, the UEs out of coverage may acquire resources only in a resource allocation acquisition manner based on UE selection. If multiple D2D UEs exist near the relay and select resources by themselves without cooperation, data transmitted to the relay by the remote UEs may be interfered by other UEs or may bring interference to transmission of other UEs, thereby resulting in that the data from the remote UEs cannot be correctly received.

Any effective solution has not been proposed yet at present for a problem existing in data transmission and/or reception caused by a resource acquisition manner.

SUMMARY

Some embodiments of the present disclosure provide a resource processing method and device, which may at least solve a problem existing in data transmission and/or reception caused by a resource acquisition manner.

According to one embodiment of the present disclosure, a resource processing method is provided. In the method, a first UE may transmit configuration information of a transmission and/or reception resource or resource pool to a second UE. The resource or resource pool may be used for indicating resource information used in information interaction between the second UE and the first UE.

In an embodiment, the act that the first UE transmits the configuration information of the transmission and/or reception resource or resource pool to the second UE may include at least one of the following acts. The first UE may transmit the configuration information of the transmission and/or reception resource or resource pool for ProSe direct discovery and ProSe direct communication to the second UE respectively. The first UE may transmit the configuration information of the transmission and/or reception resource or resource pool and mode configuration information to the second UE, and the mode configuration information may include one of the following: a scheduling-based mode, a UE autonomous resource selection mode, a first resource allocation manner and a second resource allocation manner. The first UE may transmit the configuration information of the transmission and/or reception resource or resource pool under a normal state and the configuration information of the transmission and/or reception resource or resource pool under an exception state to the second UE.

In an embodiment, the act that the first UE may transmit the configuration information of the transmission and/or reception resource or resource pool to the second UE may include at least one of the following acts. The first UE may transmit information for setting up the transmission and/or reception resource or resource pool to the second UE. The first UE may transmit information for updating the transmission and/or reception resource or resource pool to the second UE. The first UE may transmit information for releasing the transmission and/or reception resource or resource pool to the second UE.

In an embodiment, before the first UE transmits the configuration information of the transmission and/or reception resource or resource pool to the second UE, the method may further include the following acts. The first UE may transmit a request message for resource to a base station. The first UE may receive resource or resource pool information determined and sent, according to the request message, by the base station.

In an embodiment, before the first UE transmits the configuration information of the transmission and/or reception resource or resource pool to the second UE, the method further may include at least one of the following acts. The first UE may receive the configuration information of the transmission and/or reception resource or resource pool sent, through broadcast signaling or Radio Resource Control (RRC)-dedicated signaling, by a base station, and the resource or resource pool is used for indicating resource information used in information interaction between the second UE and the first UE. The first UE may receive an index of the transmission and/or reception resource or resource pool sent, through broadcast signaling or RRC-dedicated signaling, by a base station, and the first UE may determine, according to the index of the transmission and/or reception resource or resource pool, resource information used in information interaction between the second UE and the first UE.

In an embodiment, before the first UE transmits the configuration information of the transmission and/or reception resource or resource pool to the second UE, the method may further include at least one of the following acts. After receiving a transmission and/or reception resource or resource pool, sent by a base station, for ProSe or sidelink, the first UE may select a subset of the resource or resource pool, and may determine the selected subset as resource information used in information interaction between the second UE and the first UE. The first UE may configure, according to the number of connected UEs or channel state information, resource information used in information interaction between the second UE and the first UE. The first UE may determine configuration information of the transmission and/or reception resource or resource pool under a normal state and configuration information of the transmission and/or reception resource or resource pool under an exception state.

In an embodiment, the act that the first UE transmits the configuration information of the transmission and/or reception resource or resource pool to the second UE may include at least one of the following acts. The first UE may transmit the configuration information of one or more transmission and/or reception resources or resource pools to the second UE. The first UE may transmit the configuration information of the transmission and/or reception resource or resource pool to the second UE through a connection establishment completion message. The first UE may transmit the configuration information of the transmission and/or reception resource or resource pool to the second UE through a connection reconfiguration message. The first UE may transmit the configuration information of the transmission and/or reception resource or resource pool to the second UE through a connection reestablishment message. The first UE may transmit the configuration information of the transmission and/or reception resource or resource pool for connection establishment and subsequent D2D data transmission to the second UE through a discovery message. After receiving resource request information of the second UE, the first UE may transmit the configuration information of the transmission and/or reception resource or resource pool to the second UE through a resource allocation message. The first UE may transmit the configuration information of the transmission and/or reception resource or resource pool to the second UE through a discovery response message. The first UE may transmit the configuration information of the transmission and/or reception resource or resource pool to the second UE through a broadcast message. The first UE may transmit the configuration information of the transmission and/or reception resource or resource pool to the second UE through a dedicated message, and in the embodiment, the first UE may allocate identical resources or resource pools to all second UEs, or may allocate different resources or resource pools to different second UEs.

In an embodiment, the act that the first UE transmits the configuration information of the transmission and/or reception resource or resource pool to the second UE may include at least one of the following acts. The first UE may transmit exception state indication information to the second UE, and the exception state indication information may be used to instruct the second UE to use the configuration information of the transmission and/or reception resource or resource pool under an exception state. The first UE may transmit exception recovery indication information to the second UE, and the exception recovery indication information may be used for indicating the configuration information of the transmission and/or reception resource or resource pool used by the second UE under a normal state. In this embodiment, the exception state indication information and the exception recovery indication information may be carried in one of the following messages: a broadcast message, a dedicated message, a connection establishment message, a connection reconfiguration message and a connection reestablishment message.

In an embodiment, before the first UE transmits the configuration information of the transmission and/or reception resource or resource pool to the second UE, the method may further include an act of receiving transmission and/or reception resource or resource pool information transmitted by the second UE. The transmission and/or reception resource or resource pool information may include: pre-configured transmission and/or reception resource or resource pool information of the second UE, and transmission and/or reception resource or resource pool information selected by the second UE.

In an embodiment, after the first UE transmits the configuration information of the transmission and/or reception resource or resource pool to the second UE, the method may further include the following act. The first UE may transmit the configuration information of the transmission and/or reception resource or resource pool to a base station.

In an embodiment, the act that the first UE transmits the configuration information of the transmission and/or reception resource or resource pool to the base station may include the following acts. The first UE may transmit time-frequency information of the transmission and/or reception resource or resource pool to the base station. In the embodiment, the time-frequency information of the resource or resource pool may include one of the following: resource or resource pool subframe pattern indication information, resource or resource pool subframe period indication information, physical frequency domain resource block index indication information and symbol index indication information. Alternatively, the first UE may transmit an index number of the transmission and/or reception resource or resource pool to the base station. In the embodiment, the act that the first UE transmits the index number of the transmission and/or reception resource or resource pool to the base station may include the following acts. The first UE may receive a plurality of resources or resource pools transmitted by the base station, may select one or more resources or resource pools from the plurality of resources or resource pools, and may transmit one or more index numbers corresponding to the one or more resources or resource pools to the base station.

In an embodiment, the first UE may transmit the configuration information of the transmission and/or reception resource or resource pool to the base station through RRC-dedicated signaling.

According to another embodiment of the present disclosure, a resource processing method is also provided. In the method, configuration information of a transmission and/or reception resource or resource pool transmitted by a first UE may be received; and information may be transmitted and/or received according to the configuration information of the transmission and/or reception resource or resource pool.

In an embodiment, before the configuration information of the transmission and/or reception resource or resource pool transmitted by the first UE is received, the method may further include the following act. A signal for searching for the first UE may be transmitted through a pre-configured transmission resource or resource pool; or, a discovery signal transmitted by the first UE may be monitored through a pre-configured receiving resource or resource pool.

According to another embodiment of the present disclosure, a resource processing device is provided. The resource processing device may be applied to a UE, and may include a first transmission module. The first transmission module may be configured to transmit configuration information of a transmission and/or reception resource or resource pool to a second UE. In the embodiment, the resource or resource pool may be used for indicating resource information used by the second UE in information interaction with a first UE.

In an embodiment, the first transmission module may include at least one of the following a first transmission unit, a second transmission unit and a third transmission unit. The first transmission unit may be configured to transmit the configuration information of the transmission and/or reception resource or resource pool for ProSe direct discovery and ProSe direct communication to the second UE respectively. The second transmission unit may be configured to transmit the configuration information of the transmission and/or reception resource or resource pool and mode configuration information to the second UE. The mode configuration information may include one of the following: a scheduling-based mode, a UE autonomous resource selection mode, a first resource allocation manner and a second resource allocation manner. The third transmission unit may be configured to transmit the configuration information of the transmission and/or reception resource or resource pool under a normal state and the configuration information of the transmission and/or reception resource or resource pool under an exception state to the second UE.

In an embodiment, the first transmission module may include at least one of the following a fourth transmission unit, a fifth transmission unit and a sixth transmission unit. The fourth transmission unit may be configured to transmit information for setting up the transmission and/or reception resource or resource pool to the second UE. The fifth transmission unit may be configured to transmit information for updating the transmission and/or reception resource or resource pool to the second UE. The sixth transmission unit may be configured to transmit information for releasing the transmission and/or reception resource or resource pool to the second UE.

In an embodiment, the device may further include a second transmission module and a first receiving module. The second transmission module may be configured to transmit a request message for resource to a base station. The first receiving module may be configured to receive resource or resource pool information determined and sent, according to the request message, by the base station.

In an embodiment, the first transmission module may further include at least one of a first receiving unit and a second receiving unit. The first receiving unit may be configured to receive the configuration information of the transmission and/or reception resource or resource pool sent, through broadcast signaling or RRC-dedicated signaling, by a base station. The resource or resource pool may be used for indicating resource information used in information interaction between the second UE and the first UE. The second receiving unit may be configured to receive an index of the transmission and/or reception resource or resource pool sent, through broadcast signaling or RRC-dedicated signaling, by a base station, and determine, according to the index of the transmission and/or reception resource or resource pool, resource information used in information interaction between the second UE and the first UE.

In an embodiment, the device may further include at least one of the following a first determination unit, a configuration unit and a second determination unit. The first determination unit may be configured to select, after receiving a transmission and/or reception resource or resource pool, sent by a base station, for ProSe or sidelink, a subset of the resource or resource pool, and determine the selected subset as resource information used in information interaction between the second UE and the first UE. The configuration unit may be configured to configure, according to the number of connected UEs or channel state information, resource information used in information interaction between the second UE and the first UE. The second determination unit may be configured to determine configuration information of the transmission and/or reception resource or resource pool under a normal state and configuration information of the transmission and/or reception resource or resource pool under an exception state.

In an embodiment, the first transmission module may include at least one of the following: a first information transmission unit, a second information transmission unit, a third information transmission unit, a fourth information transmission unit, a fifth information transmission unit, a sixth information transmission unit, a seventh information transmission unit, an eighth information transmission unit and a ninth information transmission unit.

The first information transmission unit may be configured to transmit the configuration information of one or more transmission and/or reception resources or resource pools to the second UE. The second information transmission unit may be configured to transmit the configuration information of the transmission and/or reception resource or resource pool to the second UE through a connection establishment completion message. The third information transmission unit may be configured to transmit the configuration information of the transmission and/or reception resource or resource pool to the second UE through a connection reconfiguration message. The fourth information transmission unit may be configured to transmit the configuration information of the transmission and/or reception resource or resource pool to the second UE through a connection reestablishment message. The fifth information transmission unit may be configured to transmit the configuration information of the transmission and/or reception resource or resource pool for connection establishment and subsequent D2D data transmission to the second UE through a discovery message. The sixth information transmission unit may be configured to transmit, after receiving resource request information of the second UE, the configuration information of the transmission and/or reception resource or resource pool to the second UE through a resource allocation message. The seventh information transmission unit may be configured to transmit the configuration information of the transmission and/or reception resource or resource pool to the second UE through a discovery response message. The eighth information transmission unit may be configured to transmit the configuration information of the transmission and/or reception resource or resource pool to the second UE through a broadcast message. The ninth information transmission unit may be configured to transmit the configuration information of the transmission and/or reception resource or resource pool to the second UE through a dedicated message, and in the embodiment, the first UE may allocate identical resources or resource pools to all second UEs, or may allocate different resources or resource pools to different second UEs.

In an embodiment, the first transmission module may include at least one of an exception transmission unit and an indication transmission unit. The exception transmission unit may be configured to transmit exception state indication information to the second UE, and the exception state indication information may be used to instruct the second UE to use the configuration information of the transmission and/or reception resource or resource pool under an exception state. The indication transmission unit may be configured to transmit exception recovery indication information to the second UE, and the exception recovery indication information may be used for indicating the configuration information of the transmission and/or reception resource or resource pool used by the second UE under a normal state. The exception state indication information and the exception recovery indication information may be carried in one of the following messages: a broadcast message, a dedicated message, a connection establishment message, a connection reconfiguration message and a connection reestablishment message.

In an embodiment, the device may further include a second receiving module. The second receiving module may be configured to receive transmission and/or reception resource or resource pool information transmitted by the second UE. The transmission and/or reception resource or resource pool information may include: pre-configured transmission and/or reception resource or resource pool information of the second UE, and transmission and/or reception resource or resource pool information selected by the second UE.

In an embodiment, the device may further include a seventh transmission unit. The seventh transmission unit may be configured to transmit the configuration information of the transmission and/or reception resource or resource pool to a base station.

In an embodiment, the first transmission module may include an eighth transmission unit or a ninth transmission unit. The eighth transmission unit may be configured to transmit time-frequency information of the transmission and/or reception resource or resource pool to the base station, and the time-frequency information of the resource or resource pool may include one of the following: resource or resource pool subframe pattern indication information, resource or resource pool subframe period indication information, physical frequency domain resource block index indication information and symbol index indication information. The ninth transmission unit may be configured to transmit an index number of the transmission and/or reception resource or resource pool to the base station. The ninth transmission unit may be configured to transmit the index number of the transmission and/or reception resource or resource pool to the base station in a following manner: the first UE may receive a plurality of resources or resource pools transmitted by the base station, may select one or more resources or resource pools from the plurality of resources or resource pools, and may transmit one or more index numbers corresponding to the one or more resources or resource pools to the base station.

In an embodiment, the device may further include a third transmission module. The third transmission module may be configured to transmit the configuration information of the transmission and/or reception resource or resource pool to the base station through RRC-dedicated signaling.

According to another embodiment of the present disclosure, a resource processing device is also provided. The device may include a fourth receiving module and a processing module. The fourth receiving module may be configured to receive configuration information of a transmission and/or reception resource or resource pool transmitted by a first UE. The processing module may be configured to transmit and/or receive information according to the configuration information of the transmission and/or reception resource or resource pool.

In an embodiment, the device may further include a fourth transmission module or a fifth receiving module. The fourth transmission module may be configured to transmit, through a pre-configured transmission resource or resource pool, a signal for searching for the first UE. The fifth receiving module may be configured to monitor, through a pre-configured receiving resource or resource pool, a discovery signal transmitted by the first UE.

By means of the solution of some embodiments of the present disclosure, a first UE may transmit configuration information of a transmission and/or reception resource or resource pool to a second UE, and the resource or resource pool may be used for indicating resource information used in information interaction between the second UE and the first UE. A problem existing in data transmission and/or reception caused by a resource acquisition manner may be solved, thereby improving the success rate of data transmission and/or reception.

BRIEF DESCRIPTION OF THE DRAWINGS

FIG. 3 is a first flowchart of a resource processing method according to an embodiment of the present disclosure;

FIG. 4 is a second flowchart of a resource processing method according to an embodiment of the present disclosure;

FIG. 5 is a first block diagram of a resource processing device according to an embodiment of the present disclosure;

FIG. 6 is a first block diagram of a resource processing device according to a preferable embodiment of the present disclosure;

DETAILED DESCRIPTION OF THE EMBODIMENTS

Figure 1:
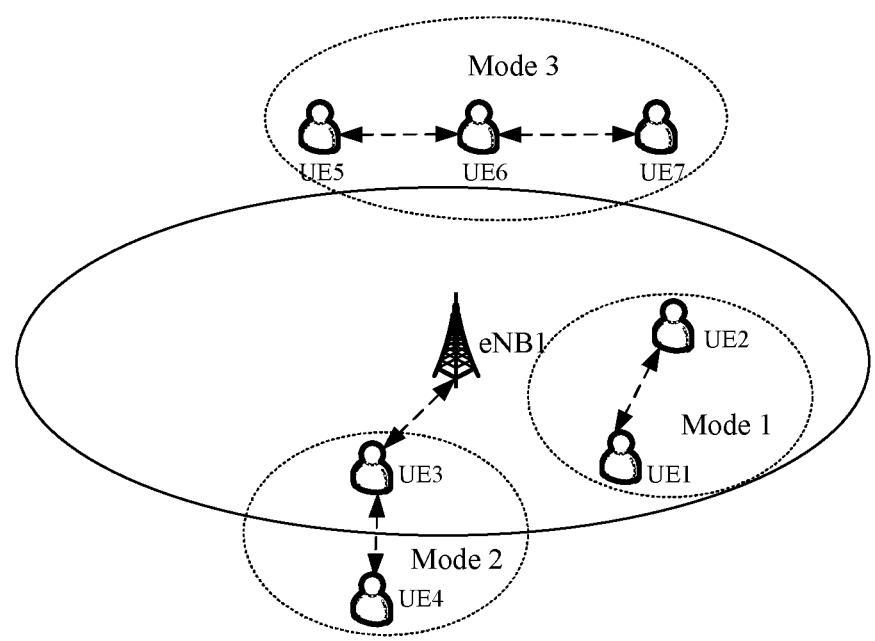
FIG. 1 is a diagram illustrating direct discovery or communication between D2D UEs.
Figure 2:
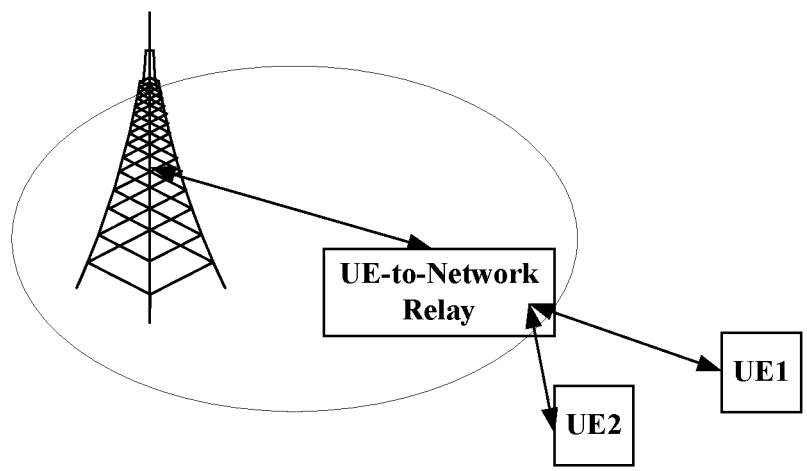
FIG. 2 is a diagram of a relay system.

In an embodiment, a resource processing method is provided. FIG. 3 is a first flowchart of a resource processing method according to an embodiment of the present disclosure. As shown in FIG. 3, the flow may include the act as follows.

At act S302, a first UE may transmit configuration information of a transmission and/or reception resource or resource pool to a second UE. The resource or resource pool may be used for indicating resource information used in information interaction between the second UE and the first UE.

By means of the abovementioned act, a first UE may transmit configuration information of a transmission and/or reception resource or resource pool to a second UE, and the resource or resource pool may be used for indicating resource information used in information interaction between the second UE and the first UE. A problem existing in data transmission and/or reception caused by a resource acquisition manner may be solved, thereby improving the success rate of data transmission and/or reception.

The act that the first UE transmits the configuration information of the transmission and/or reception resource or resource pool to the second UE may include at least one of the following acts. The first UE may transmit the configuration information of the transmission and/or reception resource or resource pool for ProSe direct discovery and ProSe direct communication to the second UE respectively. The first UE may transmit the configuration information of the transmission and/or reception resource or resource pool and mode configuration information to the second UE, and the mode configuration information may include one of the following: a scheduling-based mode, a UE autonomous resource selection mode, a first resource allocation manner and a second resource allocation manner. The first UE may transmit the configuration information of the transmission and/or reception resource or resource pool under a normal state and the configuration information of the transmission and/or reception resource or resource pool under an exception state to the second UE.

The act that the first UE transmits the configuration information of the transmission and/or reception resource or resource pool to the second UE may include at least one of the following acts. The first UE may transmit information for setting up the transmission and/or reception resource or resource pool to the second UE. The first UE may transmit information for updating the transmission and/or reception resource or resource pool to the second UE. The first UE may transmit information for releasing the transmission and/or reception resource or resource pool to the second UE.

Before the first UE transmits the configuration information of the transmission and/or reception resource or resource pool to the second UE, the first UE may transmit a request message for resource to a base station; and the first UE may receive resource or resource pool information determined and sent, according to the request message, by the base station.

Before the first UE transmits the configuration information of the transmission and/or reception resource or resource pool to the second UE, the method further may include at least one of the following acts. The first UE may receive the configuration information of the transmission and/or reception resource or resource pool sent, through broadcast signaling or RRC-dedicated signaling, by a base station, and the resource or resource pool is used for indicating resource information used in information interaction between the second UE and the first UE. The first UE may receive an index of the transmission and/or reception resource or resource pool sent, through broadcast signaling or RRC-dedicated signaling, by a base station, and the first UE may determine, according to the index of the transmission and/or reception resource or resource pool, resource information used in information interaction between the second UE and the first UE.

Before the first UE transmits the configuration information of the transmission and/or reception resource or resource pool to the second UE, the method may further include at least one of the following acts. After receiving a transmission and/or reception resource or resource pool, sent by a base station, for ProSe or sidelink, the first UE may select a subset of the resource or resource pool, and may determine the selected subset as resource information used in information interaction between the second UE and the first UE. The first UE may configure, according to the number of connected UEs or channel state information, resource information used in information interaction between the second UE and the first UE. The first UE may determine configuration information of the transmission and/or reception resource or resource pool under a normal state and configuration information of the transmission and/or reception resource or resource pool under an exception state.

The act that the first UE transmits the configuration information of the transmission and/or reception resource or resource pool to the second UE may include at least one of the following acts. The first UE may transmit the configuration information of one or more transmission and/or reception resources or resource pools to the second UE. The first UE may transmit the configuration information of the transmission and/or reception resource or resource pool to the second UE through a connection establishment completion message. The first UE may transmit the configuration information of the transmission and/or reception resource or resource pool to the second UE through a connection reconfiguration message. The first UE may transmit the configuration information of the transmission and/or reception resource or resource pool to the second UE through a connection reestablishment message. The first UE may transmit the configuration information of the transmission and/or reception resource or resource pool for connection establishment and subsequent D2D data transmission to the second UE through a discovery message. After receiving resource request information of the second UE, the first UE may transmit the configuration information of the transmission and/or reception resource or resource pool to the second UE through a resource allocation message. The first UE may transmit the configuration information of the transmission and/or reception resource or resource pool to the second UE through a discovery response message. The first UE may transmit the configuration information of the transmission and/or reception resource or resource pool to the second UE through a broadcast message. The first UE may transmit the configuration information of the transmission and/or reception resource or resource pool to the second UE through a dedicated message, and in the embodiment, the first UE may allocate identical resources or resource pools to all second UEs, or may allocate different resources or resource pools to different second UEs.

The act that the first UE transmits the configuration information of the transmission and/or reception resource or resource pool to the second UE may include at least one of the following acts. The first UE may transmit exception state indication information to the second UE, and the exception state indication information may be used to instruct the second UE to use the configuration information of the transmission and/or reception resource or resource pool under an exception state. The first UE may transmit exception recovery indication information to the second UE, and the exception recovery indication information may be used for indicating the configuration information of the transmission and/or reception resource or resource pool used by the second UE under a normal state. The exception state indication information and the exception recovery indication information may be carried in one of the following messages: a broadcast message, a dedicated message, a connection establishment message, a connection reconfiguration message and a connection reestablishment message.

Before the first UE transmits the configuration information of the transmission and/or reception resource or resource pool to the second UE, transmission and/or reception resource or resource pool information transmitted by the second UE may be received. The transmission and/or reception resource or resource pool information may include: pre-configured transmission and/or reception resource or resource pool information of the second UE, and transmission and/or reception resource or resource pool information selected by the second UE.

After the first UE transmits the configuration information of the transmission and/or reception resource or resource pool to the second UE, the first UE may transmit the configuration information of the transmission and/or reception resource or resource pool to a base station.

The act that the first UE transmits the configuration information of the transmission and/or reception resource or resource pool to the base station may include one of the following acts. The first UE may transmit time-frequency information of the transmission and/or reception resource or resource pool to the base station, and the time-frequency information of the resource or resource pool may include one of the following: resource or resource pool subframe pattern indication information, resource or resource pool subframe period indication information, physical frequency domain resource block index indication information and symbol index indication information. Alternatively, the first UE may transmit an index number of the transmission and/or reception resource or resource pool to the base station. The act that the first UE transmits the index number of the transmission and/or reception resource or resource pool to the base station may include the following acts. The first UE may receive a plurality of resources or resource pools transmitted by the base station, may select one or more resources or resource pools from the plurality of resources or resource pools, and may transmit one or more index numbers corresponding to the one or more resources or resource pools to the base station.

The first UE may transmit the configuration information of the transmission and/or reception resource or resource pool to the base station through RRC-dedicated signaling.

Another embodiment of the present disclosure provides a resource processing method. FIG. 4 is a second flowchart of a resource processing method according to an embodiment of the present disclosure. As shown in FIG. 4, the flow may include the acts as follows.

At act S402, configuration information of a transmission and/or reception resource or resource pool transmitted by a first UE may be received.

At act S404, information may be transmitted and/or received according to the configuration information of the transmission and/or reception resource or resource pool.

Before the configuration information of the transmission and/or reception resource or resource pool transmitted by the first UE is received, a signal for searching for the first UE may be transmitted through a pre-configured transmission resource or resource pool; or, a discovery signal transmitted by the first UE may be monitored through a pre-configured receiving resource or resource pool.

Still another embodiment of the present disclosure provides a resource processing device, applied to a UE. The device may be used to implement the abovementioned embodiment and preferable implementation manner. Those which have been illustrated will not be elaborated herein. Just as a term 'module' used below, the combination of software and/or hardware with predetermined functions may be implemented. Although the device described by the following embodiment is better implemented by software, the implementation of hardware or the combination of software and hardware may be possible and conceived.

FIG. 5 is a first block diagram of a resource processing device according to an embodiment of the present disclosure. As shown in FIG. 5, the device may include: a first transmission module 52.

The first transmission module 52 may be configured to transmit configuration information of a transmission and/or reception resource or resource pool to a second UE. The resource or resource pool may be used for indicating resource information used by the second UE in information interaction with a first UE.

In an embodiment, the first transmission module 52 may include at least one of a first transmission unit, a second transmission unit and a third transmission unit. The first transmission unit may be configured to transmit the configuration information of the transmission and/or reception resource or resource pool for ProSe direct discovery and ProSe direct communication to the second UE respectively. The second transmission unit may be configured to transmit the configuration information of the transmission and/or reception resource or resource pool and mode configuration information to the second UE. The mode configuration information may include one of the following: a scheduling-based mode, a UE autonomous resource selection mode, a first resource allocation manner and a second resource allocation manner. The third transmission unit may be configured to transmit the configuration information of the transmission and/or reception resource or resource pool under a normal state and the configuration information of the transmission and/or reception resource or resource pool under an exception state to the second UE.

In an embodiment, the first transmission module 52 may include at least one of a fourth transmission unit, a fifth transmission unit and a sixth transmission unit. The fourth transmission unit may be configured to transmit information for setting up the transmission and/or reception resource or resource pool to the second UE. The fifth transmission unit may be configured to transmit information for updating the transmission and/or reception resource or resource pool to the second UE. The sixth transmission unit may be configured to transmit information for releasing the transmission and/or reception resource or resource pool to the second UE.

FIG. 6 is a first block diagram of a resource processing device according to a preferable embodiment of the present disclosure. As shown in FIG. 6, the device may further include: a second transmission module 62 and a first receiving module 64.

The second transmission module 62 may be configured to transmit a request message for resource to a base station.

The first receiving module 64 may be configured to receive resource or resource pool information determined and sent, according to the request message, by the base station.

The first transmission module 52 may further include at least one of a first receiving unit and a second receiving unit. The first receiving unit may be configured to receive the configuration information of the transmission and/or reception resource or resource pool sent, through broadcast signaling or RRC-dedicated signaling, by a base station. The resource or resource pool may be used for indicating resource information used in information interaction between the second UE and the first UE. The second receiving unit may be configured to receive an index of the transmission and/or reception resource or resource pool sent, through broadcast signaling or RRC-dedicated signaling, by a base station, and determine, according to the index of the transmission and/or reception resource or resource pool, resource information used in information interaction between the second UE and the first UE.

In an embodiment, the device may further include at least one of a first determination unit, a configuration unit and a second determination unit. The first determination unit may be configured to select, after receiving a transmission and/or reception resource or resource pool, sent by a base station, for ProSe or sidelink, a subset of the resource or resource pool, and determine the selected subset as resource information used in information interaction between the second UE and the first UE. The configuration unit may be configured to configure, according to the number of connected UEs or channel state information, resource information used in information interaction between the second UE and the first UE. The second determination unit may be configured to determine configuration information of the transmission and/or reception resource or resource pool under a normal state and configuration information of the transmission and/or reception resource or resource pool under an exception state.

The first transmission module 52 may include at least one of the following: a first information transmission unit, a second information transmission unit, a third information transmission unit, a fourth information transmission unit, a fifth information transmission unit, a sixth information transmission unit, a seventh information transmission unit, a eighth information transmission unit and a ninth information transmission unit. The first information transmission unit may be configured to transmit the configuration information of one or more transmission and/or reception resources or resource pools to the second UE. The second information transmission unit may be configured to transmit the configuration information of the transmission and/or reception resource or resource pool to the second UE through a connection establishment completion message. The third information transmission unit may be configured to transmit the configuration information of the transmission and/or reception resource or resource pool to the second UE through a connection reconfiguration message. The fourth information transmission unit may be configured to transmit the configuration information of the transmission and/or reception resource or resource pool to the second UE through a connection reestablishment message. The fifth information transmission unit may be configured to transmit the configuration information of the transmission and/or reception resource or resource pool for connection establishment and subsequent D2D data transmission to the second UE through a discovery message. The sixth information transmission unit may be configured to transmit, after receiving resource request information of the second UE, the configuration information of the transmission and/or reception resource or resource pool to the second UE through a resource allocation message. The seventh information transmission unit may be configured to transmit the configuration information of the transmission and/or reception resource or resource pool to the second UE through a discovery response message. The eighth information transmission unit may be configured to transmit the configuration information of the transmission and/or reception resource or resource pool to the second UE through a broadcast message. The ninth information transmission unit may be configured to transmit the configuration information of the transmission and/or reception resource or resource pool to the second UE through a dedicated message, and in the embodiment, the first UE may allocate identical resources or resource pools to all second UEs, or may allocate different resources or resource pools to different second UEs.

The first transmission module 52 may include at least one of an exception transmission unit and an indication transmission unit. The exception transmission unit may be configured to transmit exception state indication information to the second UE, and the exception state indication information may be used to instruct the second UE to use the configuration information of the transmission and/or reception resource or resource pool under an exception state. The indication transmission unit may be configured to transmit exception recovery indication information to the second UE, and the exception recovery indication information may be used for indicating the configuration information of the transmission and/or reception resource or resource pool used by the second UE under a normal state. The exception state indication information and the exception recovery indication information may be carried in one of the following messages: a broadcast message, a dedicated message, a connection establishment message, a connection reconfiguration message and a connection reestablishment message.

In an embodiment, the device may further include a second receiving module. The second receiving module may be configured to receive transmission and/or reception resource or resource pool information transmitted by the second UE. The transmission and/or reception resource or resource pool information may include: pre-configured transmission and/or reception resource or resource pool information of the second UE, and transmission and/or reception resource or resource pool information selected by the second UE.

In an embodiment, the device may further include a seventh transmission unit. The seventh transmission unit may be configured to transmit the configuration information of the transmission and/or reception resource or resource pool to a base station.

The first transmission module 52 may include an eighth transmission unit or a ninth transmission unit. The eighth transmission unit may be configured to transmit time-frequency information of the transmission and/or reception resource or resource pool to the base station. The time-frequency information of the resource or resource pool may include one of the following: resource or resource pool subframe pattern indication information, resource or resource pool subframe period indication information, physical frequency domain resource block index indication information and symbol index indication information. The ninth transmission unit may be configured to transmit an index number of the transmission and/or reception resource or resource pool to the base station. The ninth transmission unit may be configured to transmit the index number of the transmission and/or reception resource or resource pool to the base station in a following manner: the first UE may receive a plurality of resources or resource pools transmitted by the base station, may select one or more resources or resource pools from the plurality of resources or resource pools, and may transmit one or more index numbers corresponding to the one or more resources or resource pools to the base station.

In an embodiment, the device may further include a third transmission module. The third transmission module may be configured to transmit the configuration information of the transmission and/or reception resource or resource pool to the base station through RRC-dedicated signaling.

Figure 7:
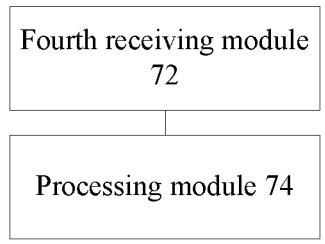
FIG. 7 is a second block diagram of a resource processing device according to an embodiment of the present disclosure.

Still another embodiment of the present disclosure provides a resource processing device. FIG. 7 is a second block diagram of a resource processing device according to an embodiment of the present disclosure. As shown in FIG. 7, the device may include a fourth receiving module 72 and a processing module 74.

The fourth receiving module 72 may be configured to receive configuration information of a transmission and/or reception resource or resource pool transmitted by a first UE.

The processing module 74 may be configured to transmit and/or receive information according to the configuration information of the transmission and/or reception resource or resource pool.

Figure 8:
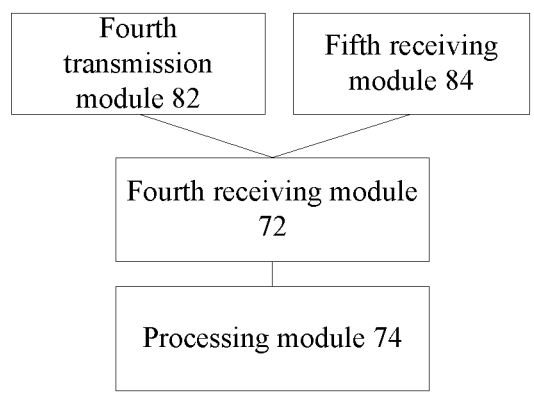
FIG. 8 is a second block diagram of a resource processing device according to a preferable embodiment of the present disclosure.

FIG. 8 is a second block diagram of a resource processing device according to a preferable embodiment of the present disclosure. As shown in FIG. 8, the device may further include a fourth transmission module 82 or a fifth receiving module 84.

The fourth transmission module 82 may be configured to transmit, through a pre-configured transmission resource or resource pool, a signal for searching for the first UE.

The fifth receiving module 84 may be configured to monitor, through a pre-configured receiving resource or resource pool, a discovery signal transmitted by the first UE.

It is important to note that each of the abovementioned modules may be implemented by software or hardware. For the latter, each module may be implemented by means of, but not limited to, the following manners. Each of the abovementioned modules may be located in different processors in a random combination manner. For example, each of the abovementioned modules may be located in the same processor, or each of the abovementioned modules may be located in different processors respectively.

The embodiments of the present disclosure will be further illustrated hereinbelow by taking a first UE as a relay and a second UE as a remote UE.

The exemplary embodiment provides a resource allocation method, a relay and a remote UE, capable of addressing a problem of resource allocation of remote equipment in a UE-to-Network Relay system, and ensuring that data from the remote equipment can be correctly received. According to the method, a relay may transmit transmission and/or reception resource or resource pool information to a remote UE through e.g., a PC5 interface. The remote UE may receive the transmission and/or reception resource or resource pool information transmitted by the relay. The remote UE may transmit and/or receive data according to the transmission and/or reception resource information. The relay may transmit the transmission and/or reception resource pool information to a base station. The remote UE may transmit a pre-configured transmission and/or reception resource or resource pool to the relay, the remote UE may transmit the selected transmission and/or reception resource or resource pool to the relay, and the relay may transmit the transmission and/or reception resource or resource pool received from the remote UE to the base station. The transmission and/or reception resource pool information may include, but not limited to, subframe pattern indication information, subframe period indication information, physical frequency domain resource block index indication information, resource pool index indication information, and symbol index indication information.

Before the remote UE receives the transmission and/or reception resource or resource pool information transmitted by the relay, the remote UE may transmit a signal for searching for the relay; or, the remote UE may detect a discovery signal transmitted by the relay. The act that the remote UE transmits a signal for searching for the relay may include the following act. The remote UE may transmit a signal for searching for the relay by using a transmission resource pre-configured by a system. The act that the remote UE detects a discovery signal transmitted by the relay may include the following act. The remote UE may monitor a discovery signal transmitted by the relay by using a receiving resource pre-configured by a system.

Before the relay transmits the transmission and/or reception resource or resource pool information to the remote UE, the relay may transmit resource pool application request information to the base station. After receiving the request information, the base station may issue a transmission and/or reception resource pool through RRC-dedicated signaling. The transmission and/or reception resource pool may be used for limiting a transmission and/or reception time-frequency resource used for interaction between the remote UE and the relay.

Before the relay transmits the transmission and/or reception resource or resource pool information to the remote UE, the relay may determine transmission and/or reception resource or resource pool information used for interaction between the remote UE and the relay. The operation that the relay determines transmission and/or reception resource or resource pool information used for interaction between the remote UE and the relay may include, but not limited to, one or more of the following acts. After receiving a transmission and/or reception resource or resource pool, sent by the base station, for ProSe or sidelink, the relay may select a subset of the transmission and/or reception resource or resource pool to serve as a transmission and/or reception resource pool used for interaction between the remote UE and the relay. Alternatively, the relay may configure, according to information such as the number of connected UEs or channel state information, a transmission and/or reception resource pool used for interaction between the remote UE and the relay. Alternatively, the relay may receive a transmission and/or reception resource pool sent through broadcast signaling or RRC-dedicated signaling, and the transmission and/or reception resource pool may be used for limiting a transmission and/or reception time-frequency resource used for interaction between the remote UE and the relay. Alternatively, the relay may receive a transmission and/or reception resource pool index sent through broadcast signaling or RRC-dedicated signaling, and the relay may determine transmission and/or reception resource pool information used for interaction between the remote UE and the relay according to the resource pool index.

The act that the relay transmits a transmission and/or reception resource or resource pool for ProSe or sidelink to the remote UE may include, but not limited to, one or more of the following acts. The relay may transmit a transmission and/or reception resource or resource pool for ProSe or sidelink to the remote UE through e.g., a PC5 interface. Alternatively, the relay may carry a transmission and/or reception resource pool subsequently used for interaction between the remote UE and the relay in a connection establishment completion message of the remote UE. Alternatively, the relay may carry a transmission and/or reception resource pool for connection establishment and subsequent D2D data transmission in a relay discovery message. Alternatively, after receiving resource request information of the remote UE, the relay may carry a transmission and/or reception resource or resource pool subsequently used for interaction between the remote UE and the relay in a resource allocation message. Alternatively, after receiving a discovery signal of the remote UE, the relay may carry a transmission and/or reception resource or resource pool subsequently used for interaction between the remote UE and the relay in a discovery response message. Alternatively, the relay may carry transmission and/or reception resource pool information subsequently used for interaction between the remote UE and the relay in a broadcast message.

The relay may report a transmission resource pool allocated to the remote UE to the base station. For example, the relay may transmit the transmission and/or reception resource pool or a resource pool index number to the base station. The operation that the relay transmits the transmission and/or reception resource pool to the base station may include, but not limited to, one or more of the following acts. The relay may transmit the transmission and/or reception resource pool to the base station through RRC-dedicated signaling or through an uplink data channel. Alternatively, the relay may transmit the transmission and/or reception resource pool index number to the base station through RRC-dedicated signaling or through an uplink data channel. The remote UE may a remote UE which selects the relay to forward data for the remote UE.

Another exemplary embodiment provides a remote UE. The remote UE may receive transmission and/or reception resource or resource pool information transmitted by a relay. The remote UE may transmit and/or receive data according to the transmission and/or reception resource or resource pool information.

Another exemplary embodiment provides a relay. The relay may transmit transmission and/or reception resource or resource pool information to a remote UE.

First Embodiment

Figure 9:
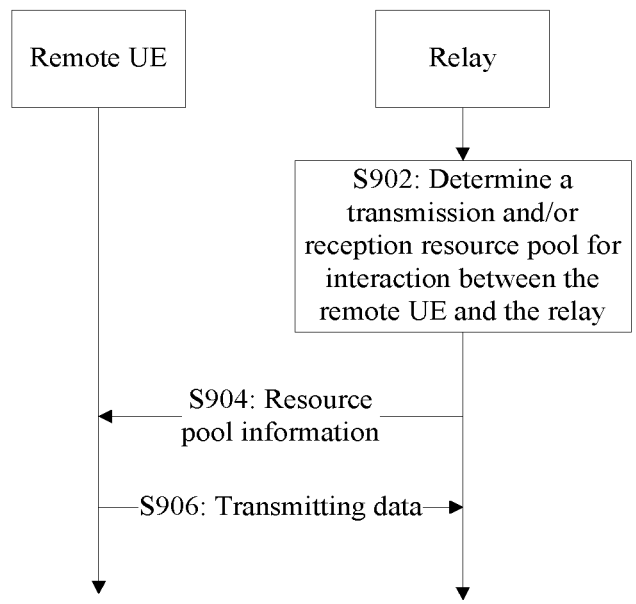
FIG. 9 is a first diagram of a resource allocation method according to an embodiment of the present disclosure.

In the present embodiment, a carrier on which a relay transmits data to a base station through e.g., a Uu interface is identical to a carrier on which the relay transmits data to a remote UE through e.g., a PC5 interface. FIG. 9 is a first diagram of a resource allocation method according to an embodiment of the present disclosure. As shown in FIG. 9, the method may include the acts as follows.

Figure 10:
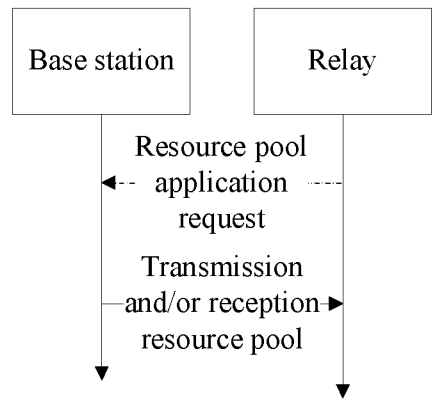
FIG. 10 is a diagram of a relay resource determination method according to an embodiment of the present disclosure.

At act S902, a relay may determine a transmission and/or reception resource pool for interaction between a remote UE and the relay. FIG. 10 is a diagram of a relay resource determination method according to an embodiment of the present disclosure. As shown in FIG. 10, the relay resource determination method may include the following acts.

The relay may transmit a resource pool application request to a base station. After receiving the request message, the base station may issue a transmission and/or reception resource pool to the relay through broadcast signaling or RRC-dedicated signaling. The relay may receive the transmission and/or reception resource pool. The transmission and/or reception resource pool may be used for limiting a transmission and/or reception time-frequency resource used for interaction between the remote UE and the relay.

At act S904, the relay may transmit the transmission and/or reception resource pool to the remote UE. The relay may transmit the transmission and/or reception resource pool to the remote UE in any one of the following manners. The relay may carry a transmission and/or reception resource pool subsequently used for interaction between the remote UE and the relay in a connection establishment completion message of the remote UE. Alternatively, the relay may carry a resource pool for connection establishment and subsequent D2D data transmission in a relay advertisement message. Alternatively, after receiving a discovery signal of the remote UE, the relay may carry a resource or resource pool subsequently used for interaction between the remote UE and the relay in a discovery response message. Alternatively, the relay may carry resource pool information subsequently used for interaction between the remote UE and the relay in a broadcast message. The relay may allocate the same resource pool to all connected remote UEs, or may allocate different resource pools to each remote UE.

At act S906, the remote UE may transmit and/or receive data on the transmission and/or reception resource pool.

Second Embodiment

The difference between the present embodiment and the first embodiment lies in the act S902. At act S902 in the present embodiment, a relay may determine a transmission and/or reception resource pool used for interaction between a remote UE and the relay. The relay may determine the transmission and/or reception resource pool used for interaction between the remote UE and the relay in the following manner. The relay may receive a transmission and/or reception resource pool index sent by a base station through broadcast signaling or RRC-dedicated signaling, and the relay may determine transmission and/or reception resource pool information used for interaction between the remote UE and the relay according to the resource pool index. When the relay receives the transmission and/or reception resource pool index sent by the base station, if the relay has received a plurality of transmission and/or reception resource pools sent by the base station through RRC-dedicated signaling, the index corresponds to a resource pool in the plurality of transmission and/or reception resource pools sent through the RRC-dedicated signaling. If the relay has received a plurality of resource pool sent through broadcast instead of dedicated signaling, the index corresponds to one or more of the broadcast resource pools. If the relay has not received any resource pool sent through the broadcast signaling or the RRC-dedicated signaling, the index corresponds to one or more of a plurality of pre-configured resource pools.

Third Embodiment

The difference between the present embodiment and the first embodiment lies in the act S902. At act S902 in the present embodiment, a relay may determine a transmission and/or reception resource pool used for interaction between a remote UE and the relay. The relay may determine the transmission and/or reception resource pool used for interaction between the remote UE and the relay in the following manner. After receiving one or more transmission and/or reception resource pools, sent by a base station, for ProSe or sidelink, the relay may select a subset of the one or more transmission and/or reception resource pools to serve as a transmission and/or reception resource pool used for interaction between the remote UE and the relay.

Fourth Embodiment

The difference between the present embodiment and the first embodiment lies in the act S902. At act S902 in the present embodiment, a relay may determine a transmission and/or reception resource pool used for interaction between a remote UE and the relay. The relay may determine the transmission and/or reception resource pool used for interaction between the remote UE and the relay in the following manner. After receiving one or more transmission and/or reception resource pools, sent by a base station, for ProSe or sidelink, the relay may select one or more of the one or more transmission and/or reception resource pools to serve as one or more transmission and/or reception resource pools used for interaction between the remote UE and the relay.

Fifth Embodiment

In the present embodiment, a carrier on which a relay transmits data to a base station through e.g., a Uu interface is different from a carrier on which the relay transmits data to a remote UE through e.g., a PC5 interface. Specifically, the difference between the present embodiment and the first embodiment lies in the act S902. At act S902 in the present embodiment, the relay may determine a transmission and/or reception resource pool used for interaction between a remote UE and the relay. The relay may determine the transmission and/or reception resource pool used for interaction between the remote UE and the relay in the following manner. The relay may self-configure a transmission and/or reception resource pool used for interaction between the remote UE and the relay according to information such as the number of connected UEs or channel state information.

Sixth Embodiment

Figure 11:
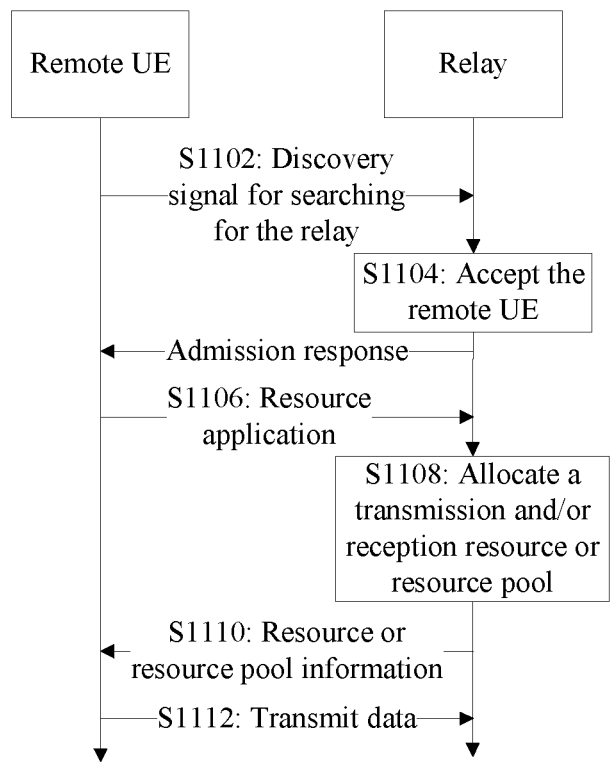
FIG. 11 is a second diagram of a resource allocation method according to an embodiment of the present disclosure.

FIG. 11 is a second diagram of a resource allocation method according to an embodiment of the present disclosure. As shown in FIG. 11, the method may include the acts as follows.

At act S1102, a remote UE may transmit a discovery signal for searching for a relay.

At act S1104, after detecting the discovery signal, the relay accepts the access of the remote UE.

At act S1106, the remote UE may transmit a resource application request to the relay. The resource application request may include, but not limited to, one or more of the following: resource application indication information of 1 bit, or resource size indication information, or quantized resource size indication information, or buffer size indication information, or quantized buffer size indication information, or a Buffer State Report (BSR). The quantized buffer size indication information may be obtained in the following manner. A buffer may be divided into M grades according to the size, and the remote UE only needs to transmit a grade number. The act that the remote UE transmits a resource application request to the relay may include: the remote UE may transmit a resource request through a Sidelink Control (SC) channel, or may transmit a resource request through a resource request channel, or may transmit a BSR through a Media Access Control (MAC) layer header.

At act S1108, the relay may determine a transmission resource or resource pool for communication between the remote UE and the relay, and the relay may determine a transmission resource of the remote UE according to transmission resource request information of the remote UE.

At act S1110, the relay may transmit the determined resource to the remote UE, and the relay may carry a resource subsequently used for data interaction between the remote UE and the relay in a resource allocation message.

At act S1112, the remote UE may transmit data on the transmission resource.

Seventh Embodiment

Figure 12:
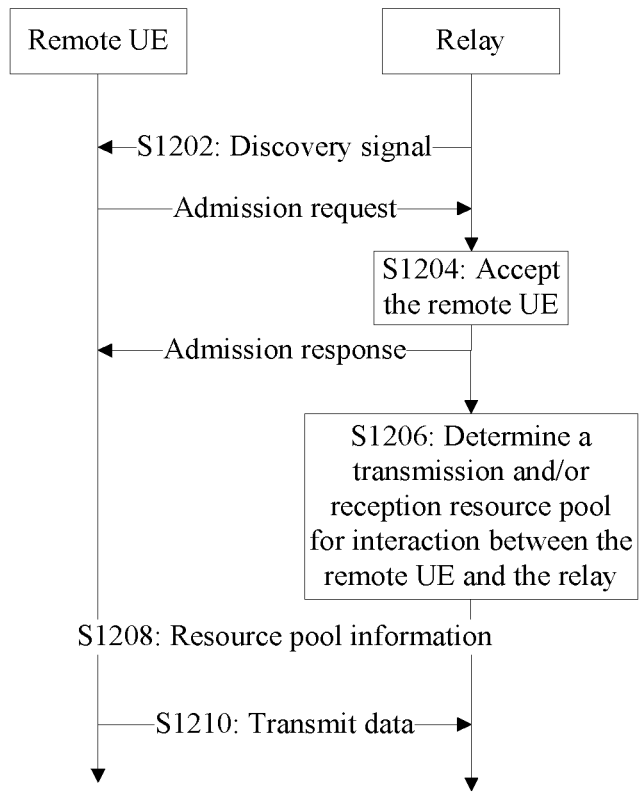
FIG. 12 is a third diagram of a resource allocation method according to an embodiment of the present disclosure.

FIG. 12 is a third diagram of a resource allocation method according to an embodiment of the present disclosure. As shown in FIG. 12, the method may include the acts as follows.

At act S1202, a relay may transmit a discovery signal. The discovery signal may be used to search for a remote UE. The discovery signal transmitted by the relay may include: a signal transmitted by the relay at a pre-configured time-frequency resource position, and/or a signal transmitted by the relay at a time-frequency resource position configured by a base station, and/or a ProSe or sidelink direct discovery signal transmitted by the relay, and/or a discovery signal specific to a relay-type UE, and/or a synchronization signal generated by the relay using a specific root sequence appointed by a protocol or a root sequence in a specific set, and/or a relay advertisement message. The advertisement message may include transmission and/or reception resource pool information.

At act S1204, after the remote UE detects the discovery signal, the remote UE may access the relay. Specifically, the remote UE may transmit admission request information, and after agreeing to accept the remote UE by judgment, the relay may transmit admission response information.

At act S1206, the relay may determine a transmission and/or reception resource pool for interaction between the remote UE and the relay. The relay may determine the transmission and/or reception resource pool for interaction between the remote UE and the relay in one of the following manners. The relay may receive a transmission and/or reception resource pool sent by the base station through broadcast signaling or RRC-dedicated signaling, and the transmission and/or reception resource pool may be used for limiting a transmission and/or reception time-frequency resource used for interaction between the remote UE and the relay. Alternatively, the relay may receive a transmission and/or reception resource pool index sent by the base station through broadcast signaling or RRC-dedicated signaling, and the relay may determine transmission and/or reception resource pool information used for interaction between the remote UE and the relay according to the resource pool index. Alternatively, after receiving one or more transmission and/or reception resource pools, sent by the base station, for ProSe or sidelink, the relay may select a subset of the one or more transmission and/or reception resource pools to serve as a transmission and/or reception resource pool used for interaction between the remote UE and the relay. Alternatively, after receiving one or more transmission and/or reception resource pools, sent by the base station, for ProSe or sidelink, the relay may select one or more of the one or more transmission and/or reception resource pools to serve as one or more transmission and/or reception resource pools used for interaction between the remote UE and the relay. Alternatively, the relay may self-configure a transmission and/or reception resource pool used for interaction between the remote UE and the relay according to information such as the number of connected UEs or channel state information.

At act S1208, the relay may transmit the transmission and/or reception resource pool information to the remote UE. The relay may carry a transmission and/or reception resource pool subsequently used for interaction between the remote UE and the relay in a connection establishment completion message of the remote UE. Alternatively, the relay may carry a resource pool for connection establishment and subsequent D2D data transmission in a relay advertisement message. Alternatively, after receiving a discovery signal of the remote UE, the relay may carry a resource or resource pool subsequently used for interaction between the remote UE and the relay in a discovery response message. Alternatively, the relay may carry resource pool information subsequently used for interaction between the remote UE and the relay in a broadcast message. The relay may allocate the same resource pool to all connected remote UEs, or may allocate different resource pools to each remote UE.

At act S1210, the remote UE may transmit and/or receive data on the transmission and/or reception resource pool.

Eighth Embodiment

A remote UE may transmit a resource application request to a relay. The resource application request may include, but not limited to, one or more of the following: resource application indication information of 1 bit, or resource size indication information, or quantized resource size indication information, or buffer size indication information, or quantized buffer size indication information, or a BSR. The quantized buffer size indication information may be obtained in the following manner. A buffer may be divided into M grades according to the size, and the remote UE only needs to transmit a grade number. The act that a remote UE transmits a resource application request to a relay may include one of the following acts. The remote UE may transmit a resource request through an SC channel, or may transmit a resource request through a resource request channel, or may transmit a BSR through an MAC layer header.

The relay may determine a transmission resource or resource pool for interaction between the remote UE and the relay, and the relay may determine a transmission resource of the remote UE according to transmission resource request information of the remote UE. The relay may transmit the transmission resource to the remote UE, and the remote UE may transmit a signal on the transmission resource.

Ninth Embodiment

Figure 13:
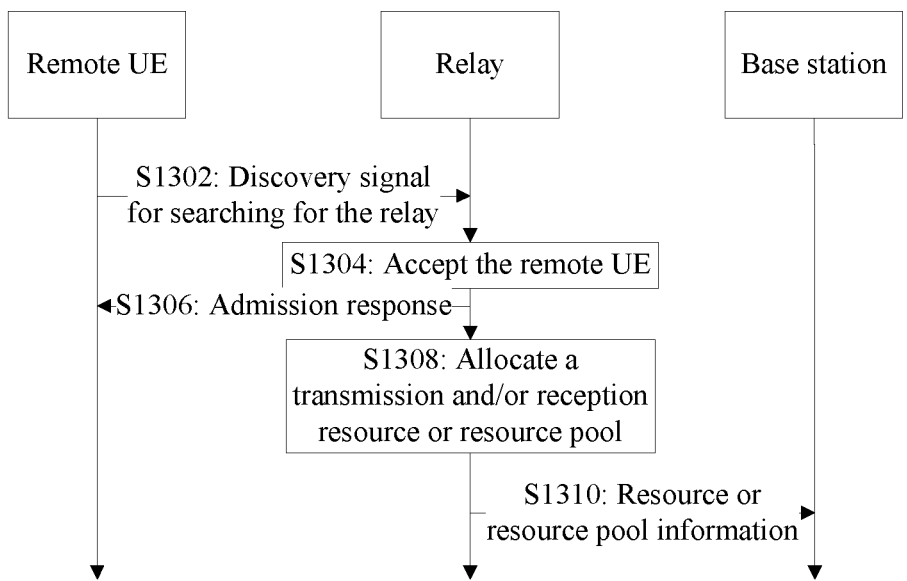
FIG. 13 is a fourth diagram of a resource allocation method according to an embodiment of the present disclosure.

In the present embodiment, a carrier on which a relay transmits data to a base station through e.g., a Uu interface is identical to a carrier on which the relay transmits data to a remote UE through e.g., a PC5 interface. FIG. 13 is a fourth diagram of a resource allocation method according to an embodiment of the present disclosure. As shown in FIG. 13, the method may include the acts as follows.

At act S1302, a remote UE may transmit a discovery signal for searching for a relay, and the remote UE may transmit a signal for searching for the relay by using a resource pre-configured by a system. The signal for searching for the relay may include: a ProSe or sidelink direct discovery signal transmitted by the remote UE, and/or a discovery signal and/or a synchronization signal specific to the remote UE, and/or a synchronization signal generated by the remote UE using a specific root sequence appointed by a protocol or a root sequence in a specific set, and/or a relay advertisement message. The advertisement message may include transmission and/or reception resource pool information.

At act S1304, after detecting the discovery signal, the relay may accept the access of the remote UE.

At act S1306, the relay may feed an admission response back to the remote UE, the relay may determine a transmission and/or reception resource pool used for interaction between the remote UE and the relay, and the relay may self-configure a transmission and/or reception resource pool used for interaction between the remote UE and the relay according to information such as the number of connected UEs or channel state information.

At act S1308, the relay may allocate a transmission and/or reception resource or resource pool.

At act S1310, the relay may transmit resource or resource pool information to a base station. For example, the relay may transmit the transmission and/or reception resource pool to the base station through RRC-dedicated signaling or through an uplink data channel. After the base station obtains the transmission and/or reception resource pool used for interaction between the remote UE and the relay, the base station may avoid scheduling resources in the resource pool to the relay for cellular communication and/or ProSe communication.

Tenth Embodiment

Figure 14:
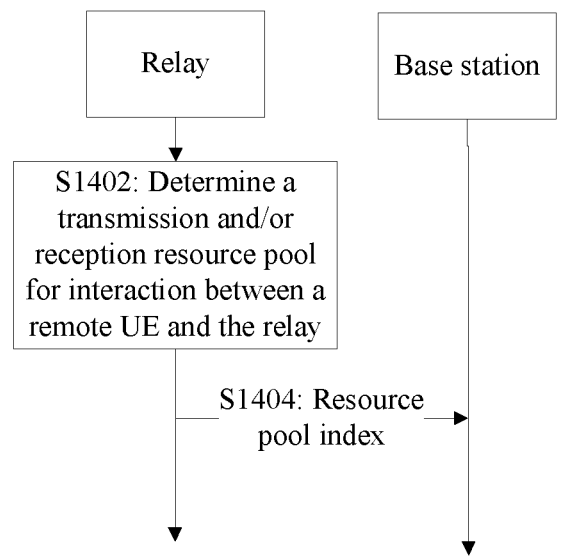
FIG. 14 is a fifth diagram of a resource allocation method according to an embodiment of the present disclosure.

In the present embodiment, a carrier on which a relay transmits data to a base station through e.g., a Uu interface is identical to a carrier on which the relay transmits data to a remote UE through e.g., a PC5 interface. FIG. 14 is a fifth diagram of a resource allocation method according to an embodiment of the present disclosure. As shown in FIG. 14, the method may include the acts as follows.

At act S1402, a relay may determine a transmission and/or reception resource or resource pool used for interaction between a remote UE and the relay. After receiving one or more transmission and/or reception resource pools, sent by a base station through broadcast signaling or RRC-dedicated signaling, for ProSe or sidelink, the relay may select a subset of the one or more transmission and/or reception resource pools to serve as a transmission and/or reception resource pool used for interaction between the remote UE and the relay. The manner for selecting the subset of the one or more transmission and/or reception resource pools may include, but not limited to: one or more transmission and/or reception resource pools, sent by the base station, for ProSe or sidelink are selected.

At act S1404, the relay may transmit the transmission and/or reception resource pool or a resource pool index number to the base station. The relay may transmit the transmission and/or reception resource pool to the base station through RRC-dedicated signaling or through an uplink data channel. Alternatively, the relay may transmit the transmission and/or reception resource pool index number to the base station through RRC-dedicated signaling or through an uplink data channel.

At act S1406, after the base station obtains the transmission and/or reception resource pool used for interaction between the remote UE and the relay, the base station may avoid scheduling resources in the resource pool to the relay for cellular communication and/or ProSe communication.

Eleventh Embodiment

A relay may determine a transmission and/or reception resource or resource pool used for interaction between a remote UE and the relay. The relay may determine the transmission and/or reception resource or resource pool used for interaction between the remote UE and the relay in the following manner. The relay may self-configure a transmission and/or reception resource pool used for interaction between the remote UE and the relay according to information such as the number of connected UEs or channel state information. The relay may transmit the transmission and/or reception resource pool to a base station, for example, the relay may transmit the transmission and/or reception resource pool to the base station through RRC-dedicated signaling or through an uplink data channel. After the base station obtains the transmission and/or reception resource pool used for interaction between the remote UE and the relay, the base station may avoid scheduling resources in the resource pool to the relay for cellular communication and/or ProSe communication.

Twelfth Embodiment

The difference between the present embodiment and the first embodiment lies in the act S902. At act S902 in the present embodiment, a relay may determine a transmission and/or reception resource pool used for interaction between a remote UE and the relay. The relay may determine the transmission and/or reception resource pool used for interaction between the remote UE and the relay in the following manner. The relay may transmit resource pool application request information to a base station. After receiving the request information, the base station may issue a transmission and/or reception resource pool through RRC-dedicated signaling. The transmission and/or reception resource pool may be used for limiting a transmission and/or reception time-frequency resource used for interaction between the remote UE and the relay. The resource pool application request information may include: a transmission resource pool application request of the remote UE.

The relay may determine the size of a transmission resource pool of the remote UE according to the number of connected remote UEs or the number of resource application, and may transmit transmission and/or reception resource pool buffer state information used for reaction with the remote UE to the base station. After receiving the request information, the base station may issue a transmission and/or reception resource pool through RRC-dedicated signaling.

Thirteenth Embodiment

In the present embodiment, an uplink frequency point of a serving cell accessed by a relay is different from a frequency point for the relay to perform sidelink communication, and a base station may not issue sidelink transmission and/or reception resource pool information. The relay and a remote UE may pre-configure transmission and/or reception resource pool information. For example, the transmission and/or reception resource pool information may be pre-configured through a Universal Integrated Circuit Card (UICC) or a Maintenance Entity (ME). The relay may select a time-frequency resource in the pre-configured transmission resource pool to transmit a discovery signal, and herein the discovery signal may be used to search for the remote UE. After the remote UE detects the discovery signal in a pre-configured receiving resource pool, the remote UE may determine to access. The relay may allocate a transmission and/or reception resource or resource pool used for information interaction to the remote UE. The transmission resource may include: a time-frequency resource specifically used by information transmission; or, a resource pool consisting of a plurality of transmission time-frequency resources, from which the remote UE may select a time-frequency resource to transmit information; or, a plurality of receiving resource pools. The relay may transmit the transmission and/or reception resource or resource pool to the remote UE. The remote UE may transmit and/or receive a signal in the transmission and/or reception resource pool.

Fourteenth Embodiment

PC5 and Uu interfaces of a relay (relay UE) may use resources of different frequency points, or may use resources of the same frequency point. In addition, resources of two frequency points may be used for transmission and reception on the PC5 interface. For example, the PC5 interface of the relay may transmit using resources of a non-public security carrier allocated by using a cellular system, while a PC5 interface of a remote UE may transmit using resources of a public security carrier pre-configured by a system. This solution may avoid a problem of half-duplex of a D2D UE to a certain extent. The resources for transmission on the PC5 interface of the relay may be resources pre-configured by the system, or resources scheduled and configured by a base station, or a resource pool dynamically adjusted by the relay according to the number of connected remote UEs. The resources for transmission on the PC5 interface of the remote UE may be pre-configured by the system or sent by the relay through broadcast or dedicated signaling.

Before access of the remote UE to the relay, the remote UE may monitor a relay advertisement or transmit a relay searching message only by using the resources pre-configured by the system, and correspondingly, the relay may return a message by using the resources of the remote UE pre-configured by the system. After connection establishment is completed, the relay may carry a range-reduced transmission and monitoring resource pool subsequently used for interaction between the remote UE and the relay in a connection establishment completion message. In addition, the relay may also carry a transmission and reception resource pool used for connection establishment and subsequent D2D data transmission in a relay advertisement message. The resource pool information may be self-configured by the relay according to the number of connected UEs, or may be configured according to the configuration of an eNB.

Fifteenth Embodiment

If a serving cell of a relay works over a public security carrier, D2D resources needed for transmitting data at a PC5 interface of the relay may only be allocated by a base station. Otherwise, PC5 communication of the relay through pre-configured resources may interfere with cellular communication. For a remote UE, under this scenario, it is suggested to ensure that transmission resources used by the remote UE are staggered with those of the relay. The resources used by the remote UE may be configured by the base station or the relay, or may be resources over a pre-configured public security carrier. If there are multiple public security carriers, the remote UE may negotiate with the relay for a public security carrier, which is not a working carrier of an eNB, to perform D2D communication.

Under the situation that the PC5 interface and a Uu interface use the same carrier, considering that a relay UE cannot work with full duplex, a dedicated resource pool may be configured for communication between the relay and the remote UE. When the base station schedules cellular resources for the relay UE, it may be suggested to avoid a PC5 resource pool configured for the relay UE.

Sixteenth Embodiment

If a relay and a remote UE pre-configure a plurality of public security frequency points, it is supposed that the relay transmits data to the remote UE at a frequency point f1 and receives data from the remote UE at f2, and on the contrary, the remote UE transmits data to the relay at f2 and receives data from the relay at f1, so both the relay and the remote UE can receive and transmit data simultaneously, thereby improving the transmission efficiency.

However, since the relay may need to receive data from other D2D UEs (including other relays) within coverage, that is to say, the relay may need to receive D2D data at frequency points namely f1 and f2 simultaneously, the relay may need to support reception of D2D data at two or more frequency points simultaneously.

Likewise, the remote UE may also need to monitor other D2D UEs out of coverage. If transmission and reception of data of the relay need to be performed simultaneously, the remote UE may need to support reception of D2D data at two or more frequency points simultaneously.

In the present embodiment, the relay may receive D2D signals at two or more frequency points simultaneously. A frequency point of a transmission resource pool allocated to the remote UE by the relay may be different from a frequency point of a transmission resource pool of the relay, but may be the same as a frequency point of a receiving resource pool of the relay. Likewise, a frequency point of a receiving resource pool allocated to the remote UE by the relay may be different from the frequency point of the receiving resource pool of the relay, but may be the same as the frequency point of the transmission resource pool of the relay.

Seventeenth Embodiment

When the number of connected UEs is increased or decreased, a relay may consider adjusting the size of a resource pool. Or, when the quality of a receiving signal of an original resource pool is reduced and the receiving signal interferes with receiving signals of resource pools of other adjacent relays, the relay may consider adjusting a time-frequency position of the resource pool. For example, under other conditions, the relay probably needs to update a transmission and/or reception resource pool used for interaction between the remote UE and the relay.

The relay may determine the updated transmission and/or reception resource pool used for interaction between the remote UE and the relay. The relay may transmit the updated transmission and/or reception resource pool to the remote UE in, for example, one of the following manners. The relay may carry resource pool information subsequently used for data interaction between the remote UE and the relay in a broadcast message. Alternatively, the relay may carry resource pool information subsequently used for data interaction between the remote UE and the relay in a dedicated message, and the relay may allocate the same resource pool to all connected remote UEs or allocate different resource pools to each remote UE. The remote UE may transmit and/or receive data on the transmission and/or reception resource pool.

Eighteenth Embodiment

When the number of connected UEs is decreased, or when the quality of a receiving signal of an original resource pool is reduced and the receiving signal interferes with receiving signals of resource pools of other adjacent relays, or under other conditions, the relay probably may need to release transmission and/or reception resource pool information previously allocated for interaction between a remote UE and the relay. This process may be implemented in the following manner.

The relay may determine a transmission and/or reception resource pool needing to be released for interaction between the remote UE and the relay. The relay may transmit the transmission and/or reception resource pool needing to be released to the remote UE in, for example, one of the following manners. The relay may carry a resource pool release indication message in a broadcast message, or, the relay may carry a resource pool release indication message in a dedicated message, and the relay may transmit resource release indication information to all connected remote UEs, or may transmit resource release indication information to some remote UEs. The remote UE which receives the resource pool release indication information cannot continuously transmit and/or receive data on the original transmission and/or reception resource pool.

Nineteenth Embodiment

When a relay undergoes a Radio Link Failure (RLF), a resource pool for data transmission at a PC5 interface of the relay may be changed, so as to affect a receiving resource pool of a remote UE. In an embodiment, the relay may accordingly need to adjust a transmission resource pool of the remote UE, so it may be needed to update information about a transmission and/or reception resource pool is needed. One solution is the same as the seventeenth embodiment, that is, the relay may transmit the updated information about the transmission and/or reception resource pool to the remote UE. Another solution is described in detail as follows.

The relay may transmit information about two sets of transmission and/or reception resource pools, including a resource pool used under a normal state and a resource pool used under an exception state, to the remote UE. Under a normal situation, the remote UE may use a normal transmission and/or reception resource pool. If the relay is exception, for example, the relay undergoes an RLF, the relay may transmit exception state indication information to the remote UE, and after receiving the indication information, the remote UE may use an exception transmission and/or reception resource pool. If the relay is restored to the normal state, the relay may transmit exception recovery indication information to the remote UE. After receiving the indication information, the remote UE may use a normal transmission and/or reception resource pool. The exception state indication information and the exception recovery indication information may be carried in, but not limited to, any one of the following messages: a relay broadcast message, a relay-dedicated message, a connection establishment message, a connection reconfiguration message and a connection reestablishment message.

Twentieth Embodiment

A relay may configure transmission and/or reception resource pools for ProSe direct discovery and ProSe direct communication respectively. The transmission and/or reception resource pools for ProSe direct discovery and ProSe direct communication may be transmitted in a broadcast manner. After receiving the resource pools, a remote UE may transmit and/or receive ProSe direct discovery data on the transmission and/or reception resource pools for ProSe direct discovery, and may transmit and/or receive ProSe direct communication data on the transmission and/or reception resource pools for ProSe direct communication.

Obviously, a person skilled in the art shall understand that all of the abovementioned modules or acts in the present disclosure may be implemented by using a general calculation device, may be centralized on a single calculation device or may be distributed on a network composed of a plurality of calculation devices. Alternatively, they may be implemented by using executable program codes of the calculation devices. Thus, they may be stored in a storage device and executed by the calculation devices, the shown or described acts may be executed in a sequence different from this sequence under certain conditions, or they are manufactured into each integrated circuit module respectively, or multiple modules or acts therein are manufactured into a single integrated circuit module. Thus, the present disclosure is not limited to a combination of any specific hardware and software.

The above is only the preferable embodiments of the present disclosure, and not intended to limit the present disclosure. As will occur to a person skilled in the art, the present disclosure is susceptible to various modifications and changes. Any modifications, equivalent replacements, improvements and the like made within the principle of the present disclosure shall fall within the scope of protection defined by the appended claims of the present disclosure.

INDUSTRIAL APPLICABILITY

The abovementioned embodiments of the present disclosure may be applied to the field of communications, solve a problem existing in data transmission and/or reception caused by a resource acquisition manner, and improve the success rate of data transmission and/or reception.

What is claimed is:

1. A resource processing method, comprising:
    transmitting, by a first User equipment (UE), configuration information of a transmission and/or reception resource or resource pool to a second UE, wherein the transmission and/or reception resource or resource pool is used for indicating resource information used for discovery or communication between the second UE and the first UE;
    wherein transmitting, by the first UE, the configuration information of the transmission and/or reception resource or resource pool to the second UE comprises at least one of the following: transmitting, by the first UE, the configuration information of the transmission and/or reception resource or resource pool for Proximity Services (ProSe) direct discovery and ProSe direct communication to the second UE respectively; transmitting, by the first UE, the configuration information of the transmission and/or reception resource or resource pool and mode configuration information to the second UE, wherein the mode configuration information comprises one of the following: a scheduling-based mode, a UE autonomous resource selection mode, a first resource allocation manner and a second resource allocation manner; transmitting, by the first UE, the configuration information of the transmission and/or reception resource or resource pool under a normal state and the configuration information of the transmission and/or reception resource or resource pool under an exception state to the second UE;
    wherein before the first UE transmits the configuration information of the transmission and/or reception resource or resource pool to the second UE, the method further comprises at least one of the following: after the first UE receives a transmission and/or reception resource or resource pool, sent by a base station, for Proximity Services (ProSe) or sidelink, selecting a subset of the transmission and/or reception resource or resource pool, and determining the selected subset as resource information used for discovery or communication between the second UE and the first UE; configuring, by the first UE according to the number of connected UEs or channel state information, resource information used for discovery or communication between the second UE and the first UE; determining, by the first UE, the configuration information of the transmission and/or reception resource or resource pool under a normal state and the configuration information of the transmission and/or reception resource or resource pool under an exception state.

2. The method as claimed in claim 1, wherein transmitting, by the first UE, the configuration information of the transmission and/or reception resource or resource pool to the second UE comprises at least one of the following:
    transmitting, by the first UE, information for setting up the transmission and/or reception resource or resource pool to the second UE;

transmitting, by the first UE, information for updating the transmission and/or reception resource or resource pool to the second UE;

transmitting, by the first UE, information for releasing the transmission and/or reception resource or resource pool to the second UE.

3. The method as claimed in claim 1, wherein before the first UE transmits the configuration information of the transmission and/or reception resource or resource pool to the second UE, the method further comprises:

transmitting, by the first UE, a request message for resource to a base station; and receiving, by the first UE, resource or resource pool information determined and sent, according to the request message, by the base station.

4. The method as claimed in claim 1, wherein before the first UE transmits the configuration information of the transmission and/or reception resource or resource pool to the second UE, the method further comprises at least one of the following:

receiving, by the first UE, the configuration information of the transmission and/or reception resource or resource pool sent, through broadcast signaling or Radio Resource Control (RRC)-dedicated signaling, by a base station, wherein the transmission and/or reception resource or resource pool is used for indicating resource information used for discovery or communication between the second UE and the first UE;

receiving, by the first UE, an index of the transmission and/or reception resource or resource pool sent, through broadcast signaling or RRC-dedicated signaling, by a base station, and determining, by the first UE, resource information used for discovery or communication between the second UE and the first UE according to the index of the transmission and/or reception resource or resource pool.

5. The method as claimed in claim 1, wherein transmitting, by the first UE, the configuration information of the transmission and/or reception resource or resource pool to the second UE comprises at least one of the following:

transmitting, by the first UE, the configuration information of one or more transmission and/or reception resources or resource pools to the second UE;

transmitting, by the first UE, the configuration information of the transmission and/or reception resource or resource pool to the second UE through a connection establishment completion message;

transmitting, by the first UE, the configuration information of the transmission and/or reception resource or resource pool to the second UE through a connection reconfiguration message;

transmitting, by the first UE, the configuration information of the transmission and/or reception resource or resource pool to the second UE through a connection reestablishment message;

transmitting, by the first UE, the configuration information of the transmission and/or reception resource or resource pool for connection establishment and subsequent ProSe or sidelink transmission to the second UE through a discovery message;

after the first UE receives resource request information of the second UE, transmitting, by the first UE, the configuration information of the transmission and/or reception resource or resource pool to the second UE through a resource allocation message;

transmitting, by the first UE, the configuration information of the transmission and/or reception resource or resource pool to the second UE through a discovery response message;

transmitting, by the first UE, the configuration information of the transmission and/or reception resource or resource pool to the second UE through a broadcast message;

transmitting, by the first UE, the configuration information of the transmission and/or reception resource or resource pool to the second UE through a dedicated message, wherein the first UE allocates identical resources or resource pools to all second UEs, or allocates different resources or resource pools to different second UEs.

6. The method as claimed in claim 1, wherein transmitting, by the first UE, the configuration information of the transmission and/or reception resource or resource pool to the second UE comprises at least one of the following:

transmitting, by the first UE, exception state indication information to the second UE, wherein the exception state indication information is used for indicating the configuration information of the transmission and/or reception resource or resource pool used by the second UE under an exception state;

transmitting, by the first UE, exception recovery indication information to the second UE, wherein the exception recovery indication information is used for indicating the configuration information of the transmission and/or reception resource or resource pool used by the second UE under a normal state, wherein the exception state indication information and the exception recovery indication information are carried in one of the following messages: a broadcast message, a dedicated message, a connection establishment message, a connection reconfiguration message and a connection reestablishment message.

7. The method as claimed in claim 1, wherein before the first UE transmits the configuration information of the transmission and/or reception resource or resource pool to the second UE, the method further comprises:

receiving, by the first UE, transmission and/or reception resource or resource pool information transmitted by the second UE, wherein the transmission and/or reception resource or resource pool information comprises: pre-configured transmission and/or reception resource or resource pool information of the second UE, and transmission and/or reception resource or resource pool information selected by the second UE.

8. The method as claimed in claim 7, wherein after the first UE transmits the configuration information of the transmission and/or reception resource or resource pool to the second UE, the method further comprises:

transmitting, by the first UE, the configuration information of the transmission and/or reception resource or resource pool to a base station.

9. The method as claimed in claim 8, wherein transmitting, by the first UE, the configuration information of the transmission and/or reception resource or resource pool to the base station comprises:

transmitting, by the first UE, time-frequency information of the transmission and/or reception resource or resource pool to the base station, wherein the time-frequency information of the transmission and/or reception resource or resource pool comprises one of the following: resource or resource pool subframe pattern indication information, resource or resource pool subframe period indication information, physical frequency domain resource block index indication information and symbol index indication information; or, transmitting, by the first UE, an index number of the transmission and/or reception resource or resource pool to the base station, wherein transmitting, by the first UE, an index number of the transmission and/or reception resource or resource pool to the base station comprises: receiving, by the first UE, a plurality of resources or resource pools transmitted by the base station, selecting one or more resources or resource pools from the plurality of resources or resource pools, and transmitting one or more index numbers corresponding to the one or more resources or resource pools to the base station.

10. The method as claimed in claim 8, wherein the first UE transmits the configuration information of the transmission and/or reception resource or resource pool to the base station through RRC-dedicated signaling.

11. A resource processing device, applied to a User equipment (UE), the device comprising a hardware processor arranged to execute program modules comprising:

a first transmission module, configured to transmit configuration information of a transmission and/or reception resource or resource pool to a second UE, wherein the transmission and/or reception resource or resource pool is used for indicating resource information used by the second UE for discovery or communication with a first UE;

the first transmission module comprises at least one of the following: a first transmission unit, configured to transmit the configuration information of the transmission and/or reception resource or resource pool for Proximity Services (ProSe) direct discovery and ProSe direct communication to the second UE respectively; a second transmission unit, configured to transmit the configuration information of the transmission and/or reception resource or resource pool and mode configuration information to the second UE, wherein the mode configuration information comprises one of the following: a scheduling-based mode, a UE autonomous resource selection mode, a first resource allocation manner and a second resource allocation manner; a third transmission unit, configured to transmit the configuration information of the transmission and/or reception resource or resource pool under a normal state and the configuration information of the transmission and/or reception resource or resource pool under an exception state to the second UE;

the hardware processor is arranged to execute program modules further comprising at least one of the following:

a first determination unit, configured to select, after receiving a transmission and/or reception resource or resource pool, sent by a base station, for Proximity Services (ProSe) or sidelink, a subset of the transmission and/or reception resource or resource pool, and determine the selected subset as resource information used for discovery or communication between the second UE and the first UE;

a configuration unit, configured to configure, according to the number of connected UEs or channel state information, resource information used for discovery or communication between the second UE and the first UE;

a second determination unit, configured to determine the configuration information of the transmission and/or reception resource or resource pool under a normal state and the configuration information of the transmission and/or reception resource or resource pool under an exception state.

12. The device as claimed in claim 11, wherein the first transmission module comprises at least one of the following:

a fourth transmission unit, configured to transmit information for setting up the transmission and/or reception resource or resource pool to the second UE;

a fifth transmission unit, configured to transmit information for updating the transmission and/or reception resource or resource pool to the second UE;

a sixth transmission unit, configured to transmit information for releasing the transmission and/or reception resource or resource pool to the second UE;

or, the first transmission module further comprises at least one of the following:

a first receiving unit, configured to receive the configuration information of the transmission and/or reception resource or resource pool sent, through broadcast signaling or RRC-dedicated signaling, by a base station, wherein the transmission and/or reception resource or resource pool is used for indicating resource information used for discovery or communication between the second UE and the first UE;

a second receiving unit, configured to receive an index of the transmission and/or reception resource or resource pool sent, through broadcast signaling or RRC-dedicated signaling, by a base station, and determine, according to the index of the transmission and/or reception resource or resource pool, resource information used for discovery or communication between the second UE and the first UE;

or, the first transmission module comprises at least one of the following:

a first information transmission unit, configured to transmit the configuration information of one or more transmission and/or reception resources or resource pools to the second UE;

a second information transmission unit, configured to transmit the configuration information of the transmission and/or reception resource or resource pool to the second UE through a connection establishment completion message;

a third information transmission unit, configured to transmit the configuration information of the transmission and/or reception resource or resource pool to the second UE through a connection reconfiguration message;

a fourth information transmission unit, configured to transmit the configuration information of the transmission and/or reception resource or resource pool to the second UE through a connection reestablishment message;

a fifth information transmission unit, configured to transmit the configuration information of the transmission and/or reception resource or resource pool for connection establishment and subsequent ProSe or sidelink transmission to the second UE through a discovery message;

a sixth information transmission unit, configured to transmit, after receiving resource request information of the second UE, the configuration information of the transmission and/or reception resource or resource pool to the second UE through a resource allocation message;
a seventh information transmission unit, configured to transmit the configuration information of the transmission and/or reception resource or resource pool to the second UE through a discovery response message;
an eighth information transmission unit, configured to transmit the configuration information of the transmission and/or reception resource or resource pool to the second UE through a broadcast message;
a ninth information transmission unit, configured to transmit the configuration information of the transmission and/or reception resource or resource pool to the second UE through a dedicated message, wherein the first UE allocates identical resources or resource pools to all second UEs, or allocates different resources or resource pools to different second UEs;

or, the first transmission module comprises at least one of the following:
an exception transmission unit, configured to transmit exception state indication information to the second UE, wherein the exception state indication information is used for indicating the configuration information of the transmission and/or reception resource or resource pool used by the second UE under an exception state;
an indication transmission unit, configured to transmit exception recovery indication information to the second UE, wherein the exception recovery indication information is used for indicating the configuration information of the transmission and/or reception resource or resource pool used by the second UE under a normal state,
wherein the exception state indication information and the exception recovery indication information are carried in one of the following messages: a broadcast message, a dedicated message, a connection establishment message, a connection reconfiguration message and a connection reestablishment message.

13. The device as claimed in claim 11,
the hardware processor is arranged to execute program modules further comprising:
a second transmission module, configured to transmit a request message for resource to a base station; and
a first receiving module, configured to receive resource or resource pool information determined and sent, according to the request message, by the base station;

or, the hardware processor is arranged to execute program modules further comprising:
a second receiving module, configured to receive transmission and/or reception resource or resource pool information transmitted by the second UE, wherein the transmission and/or reception resource or resource pool information comprises: pre-configured transmission and/or reception resource or resource pool information of the second UE, and transmission and/or reception resource or resource pool information selected by the second UE.

14. The device as claimed in claim 13, wherein the hardware processor is arranged to execute program modules further comprising:
a seventh transmission unit, configured to transmit the configuration information of the transmission and/or reception resource or resource pool to a base station.

15. The device as claimed in claim 14, wherein
the first transmission module comprises:
an eighth transmission unit, configured to transmit time-frequency information of the transmission and/or reception resource or resource pool to the base station, wherein the time-frequency information of the transmission and/or reception resource or resource pool comprises one of the following: resource or resource pool subframe pattern indication information, resource or resource pool subframe period indication information, physical frequency domain resource block index indication information and symbol index indication information; or,
a ninth transmission unit, configured to transmit an index number of the transmission and/or reception resource or resource pool to the base station, wherein the ninth transmission unit is configured to transmit the index number of the transmission and/or reception resource or resource pool to the base station in a following manner: receiving, by the first UE, a plurality of resources or resource pools transmitted by the base station, selecting one or more resources or resource pools from the plurality of resources or resource pools, and transmitting one or more index numbers corresponding to the one or more resources or resource pools to the base station;

or, the hardware processor is arranged to execute program modules further comprising:
a third transmission module, configured to transmit the configuration information of the transmission and/or reception resource or resource pool to the base station through Radio Resource Control (RRC)-dedicated signaling.

* * * * *